United States Patent
Obayashi

(10) Patent No.: US 7,330,014 B2
(45) Date of Patent: Feb. 12, 2008

(54) METHOD AND SYSTEM FOR CONTROLLING POWER TO BE FED TO ELECTRICAL LOADS

(75) Inventor: Kazuyoshi Obayashi, Chita-gun (JP)

(73) Assignee: Denso Corporation, Kariya (JP)

( * ) Notice: Subject to any disclaimer, the term of this patent is extended or adjusted under 35 U.S.C. 154(b) by 40 days.

(21) Appl. No.: 11/230,523

(22) Filed: Sep. 21, 2005

(65) Prior Publication Data

US 2006/0066287 A1 Mar. 30, 2006

(30) Foreign Application Priority Data

Sep. 21, 2004 (JP) ............................. 2004-273915
Sep. 29, 2004 (JP) ............................. 2004-284555

(51) Int. Cl.
H02H 7/06 (2006.01)
H02P 9/00 (2006.01)
H02P 11/00 (2006.01)
H02P 9/14 (2006.01)

(52) U.S. Cl. ........................................ 322/24; 322/46
(58) Field of Classification Search .................. 322/24, 322/46, 26, 28
See application file for complete search history.

(56) References Cited

U.S. PATENT DOCUMENTS

| | | | | |
|---|---|---|---|---|
| 2,958,034 A * | 10/1960 | Hobbs | .......................... | 322/25 |
| 3,105,186 A * | 9/1963 | Zelina | .......................... | 322/36 |
| 3,210,645 A * | 10/1965 | Domann | ....................... | 322/28 |
| 4,012,677 A * | 3/1977 | Rist et al. | .................... | 318/149 |
| 4,553,516 A * | 11/1985 | Hasegawa | ................. | 290/40 C |
| 4,636,706 A | 1/1987 | Bowman et al. | | |
| 5,206,580 A * | 4/1993 | Okamoto et al. | ............. | 322/46 |
| 5,231,344 A * | 7/1993 | Marumoto et al. | ........... | 322/14 |
| 5,998,880 A * | 12/1999 | Kumar | ....................... | 290/40 B |
| 6,005,372 A * | 12/1999 | Kouwa et al. | ................ | 322/25 |
| 6,798,627 B2 * | 9/2004 | Schultz et al. | ................ | 361/20 |
| 2002/0149347 A1 * | 10/2002 | Asada | .......................... | 322/28 |
| 2005/0140342 A1 * | 6/2005 | Maehara et al. | .............. | 322/36 |
| 2005/0269880 A1 * | 12/2005 | Konishi | ..................... | 307/10.7 |

FOREIGN PATENT DOCUMENTS

| | | |
|---|---|---|
| JP | A 58-192499 | 11/1983 |
| JP | A 62-64299 | 3/1987 |
| JP | A 05-098987 | 4/1993 |
| JP | A 05-260679 | 10/1993 |
| JP | A 07-011965 | 1/1995 |

* cited by examiner

*Primary Examiner*—Julio C. Gonzalez
(74) *Attorney, Agent, or Firm*—Oliff & Berridge, PLC

(57) ABSTRACT

In a control system, a control unit is connected to a generator and is configured to, when a steep change in a load current flowing through at least one specific electrical load is sensed, control the output of the generator based on the sensed steep change in the load current. This allows variations in a voltage of a power supply system to decrease while converging the voltage of the power supply system to a predetermined target voltage.

7 Claims, 9 Drawing Sheets

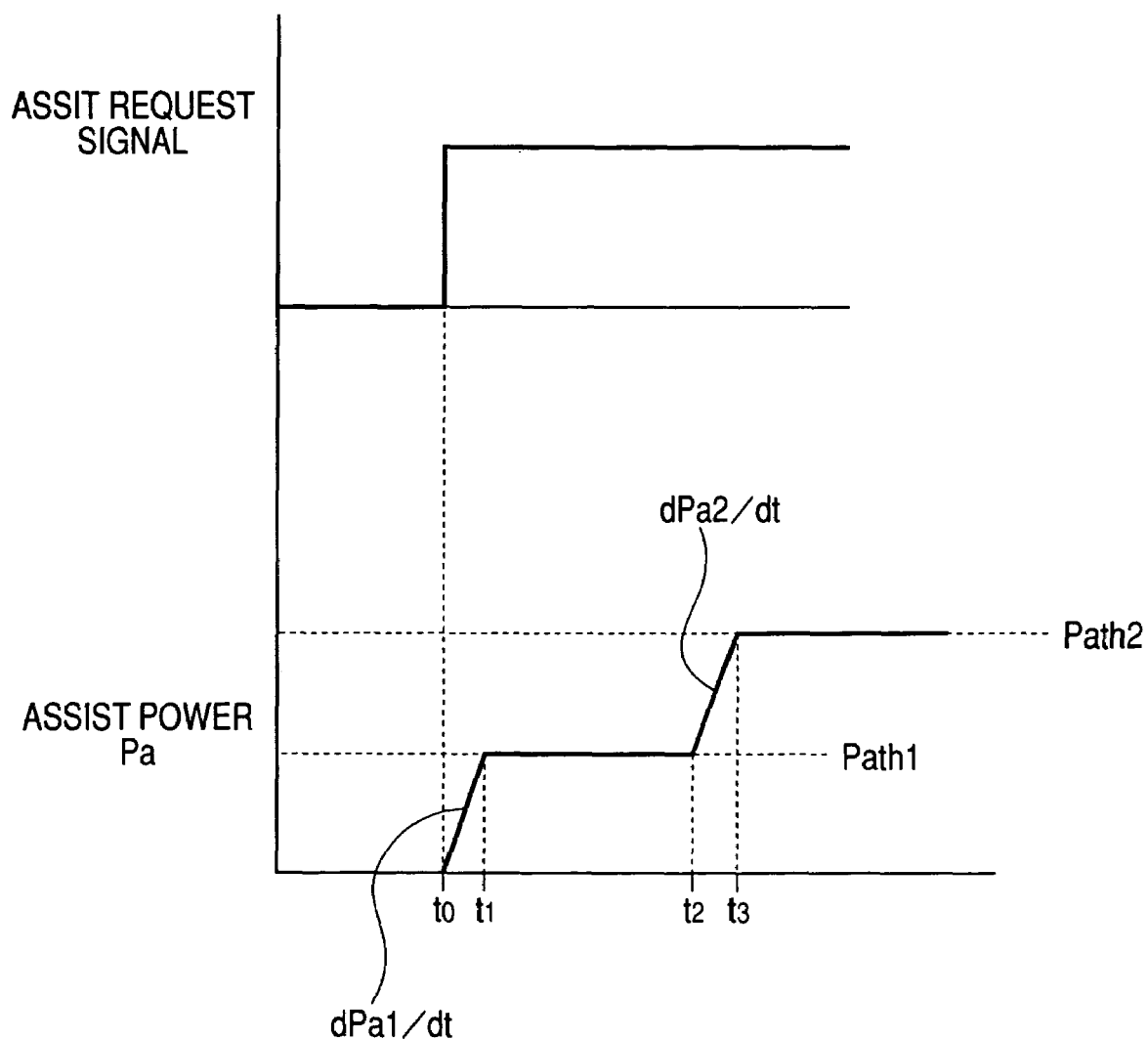

METHOD AND SYSTEM FOR CONTROLLING POWER TO BE FED TO ELECTRICAL LOADS

CROSS REFERENCE TO RELATED APPLICATION

This application is based on Japanese Patent Applications 2004-273915 and 2004-284555 filed on Sep. 21, 2004 and Sep. 29, 2004, respectively. The descriptions of these Patent Applications are all incorporated herein by reference.

BACKGROUND OF THE INVENTION

1. Field of the Invention

The present invention relates to methods and systems for controlling power to be fed to electrical loads. More particularly, the present invention relates to methods and systems for controlling the output of a generator to make it follow variations in power demands of electrical loads.

2. Description of the Related Art

As generators for vehicles, alternators are commonly used. An alternator has field windings and can regulate a field current flowing therethrough so as to control the alternator output (output power). The alternator output is supplied to vehicle electrical loads, referred to simply as loads hereinafter, and a battery.

For example, the loads include an electrically assisted turbocharger. The electrically assisted turbocharger is operative to boost charge air in an engine using wasted energy in the exhaust gas thereof, which will contribute to downsizing of the engine. The engine's downsizing will provide reduction in size and weight of the vehicle and improve the fuel efficiency of the engine. Specifically, even if demand for sudden acceleration occurs, the electrically assisted turbocharger can add electric energy (assist power) to an electric motor thereof to electrically assist rotation of a turbocharger's turbine. This allows the rotation of the turbine to match fuel and boost for the desired power output corresponding to the sudden acceleration, making it possible to reduce "turbo lag" in developing power in the engine for sudden acceleration.

As an example of controlling electrically assisted turbochargers, Japanese Unexamined Patent Publication No. H7-11965 discloses a control apparatus. The control apparatus is operative to cause a batter to feed the maximum current to a motor of an electrically assisted turbocharger at the early stages of electric driving of the motor so that the boost pressure reaches a predetermined pressure in order to improve the response of the turbocharger to sudden acceleration of the engine.

In the control apparatus disclosed in the Patent Publication, a cycle of supplying high power from the battery to the motor and, thereafter, of charging the battery by the alternator is needed to be repeated every driver's requirement of power output corresponding to sudden acceleration. This may cause deterioration of the battery to be accelerated.

This problem set forth above appears prominently when supplying the maximum current (assist power) from the battery to the motor of the electrically assisted turbocharger in order to improve the response of the turbocharger to sudden acceleration of the engine.

Even if feeding the maximum power to the electrically assisted turbocharger immediately in response to the start of operation thereof, an inertial delay of the turbocharger and a high power loss at the start of operation of the motor may reduce the efficiency in the use of the power fed to the turbocharger.

Note that, upon decrease in the power supply voltage due to discharge of the battery, the control apparatus executes a compensating operation of controlling the alternator to increase the output thereof, thereby compensating the discharge of the battery and the decrease in the power supply voltage. If feeding the maximum power to the electrically assisted turbocharger immediately in response to the start of operation thereof, the compensating operation cannot keep up with the discharge of the battery. This may make it difficult to prevent the discharge of the battery and the decrease in the power supply voltage.

On the other hand, the alternator output is needed to match the amount of power demands of loads in the long run. A short-term mismatch between the alternator output and power requirements of loads, such as load currents, is tolerated under charge and discharge load of the battery connected in parallel to the loads. It is preferable that the alternator output quickly follows changes in power requirements of the loads in view of reduction of the charge and discharge load of the battery.

As an example of control of the alternator output, alternator output control with maintenance of battery voltage has been commonly used. When a mismatch between the alternator output and the amount of power requirements of loads occurs, the alternator output control with maintenance of battery voltage is configured to cause the battery to charge and/or discharge in order to make up for the mismatch. When the charge and/or discharge of the batter results in that the battery voltage varies, the alternator output control with maintenance of battery voltage is configured to detect the battery voltage variation to regulate the alternator output based on the detected result.

As another example of control of the alternator output, Japanese Unexamined Patent Publication No. S58-192499 discloses alternator output control configured to constantly measure the total amount of load currents of loads as the amount of power requirements of loads, and to supply the amount of a field current, which allows the alternator to generate electric power as much as the measured amount of power requirements. This alternator output control disclosed in the Patent Publication No. S58-192499 is referred to as "current coincident alternator output control" hereinafter.

The current coincident alternator output control has an advantage in which the charge and discharge load is reduced because it is possible to regulate the alternator output such that it follows changes in the amount of power requirements of loads with high response, as compared with the alternator output control with maintenance of battery voltage.

In addition, in order to make up for the practically unavoidable gap between the amount of power requirements of loads and the alternator output, the Patent Publication No. S58-192499 discloses a method of, when the variation in battery voltage exceeds a predetermined range, gradually correcting the amount of filed currents to cancel the battery voltage variation to regulate the alternator output.

As a further example of control of the alternator output, U.S. Pat. No. 4,636,706 corresponding to Japanese Unexamined Patent Publication No. S62-64299 discloses alternator output control configured to positively use the mismatch toleration effect between the alternator output and the amount of power requirements of loads by the battery.

Specifically, this control is configured to forcibly reduce sudden changes of a field current in the alternator so as to prevent the load torque of the alternator from steeply changing. The control disclosed in the Patent Publication No. S62-64299 is referred to as "field-current reduction alternator output control". The field-current reduction alternator output control may however cause an unacceptable drop in the battery voltage due to delay of the changes in the field current.

Against the background of the control disclosed in the Patent Publication No. S62-64299, Japanese Unexamined Patent Publication No. H05-260679 discloses a method of prohibiting the field-current reduction alternator output control when booting a predetermined load. In the control disclosed in the Patent Publication No. H05-260679, however, when the load currents abruptly change during prohibition period of the field-current reduction alternator output control, the alternator output significantly changes for canceling the abrupt changes of the load currents. This may cause voltage hunting to easily appear.

In the current coincident alternator output control disclosed in the Patent Publication No. S58-192499, in order to reduce changes in the battery voltage due to an accumulation of the gap between the measured amount of power requirements and the alternator output corrected to correspond thereto, the field current to be supplied to the alternator is controlled when the changes in the battery voltage exceed a predetermined range.

While the field cent to be supplied to the alternator is controlled for canceling the changes in the battery voltage, however, the response of the regulation of the alternator output to the changes in the amount of power requirements of loads may deteriorate. This may reduce the advantage obtained by using the current coincident alternator output control.

SUMMARY OF THE INVENTION

The present invention has been made on the background above. Specifically, at least one preferable embodiment of the present invention provides a method and system for controlling power to be fed to an electrically assisted supercharger, which is capable of improving the response to an acceleration requirement while preventing the discharge of a battery and/or reduction in a power supply voltage.

At lest another one of the present invention provides a method and system for controlling power to be fed to an electrical load, which is capable of improving both the response of regulation of the output of an alternator to changes in a power requirement of the electrical load and the stability of a battery-voltage.

According to one aspect of the present invention, there is provided a control system for controlling power to be fed to a plurality of electrical loads from a power supply system having an engine-driven generator and a battery chargeable by an output of the generator. The control system includes a control unit connected to the generator. The control unit is configured to, when a steep change in a load current flowing through at least one specific electrical load in the electrical loads is sensed, control the output of the generator based on the sensed steep change in the load current. The control of the output of the generator allows variations in a voltage of the power supply system to decrease while converging the voltage of the power supply system to a predetermined target voltage.

According to another aspect of the present invention, there is provided a control system for controlling assist power from a power supply system to be fed to an electrically assisted supercharger for boosting a charge air in an engine. The power supply system has an engine-driven generator and a battery chargeable by an output of the generator. The control system includes an increasing rate setting unit configured to set an increasing rate during a first period at an early stage of the power assist. The control system includes an increasing unit configured to increase the assist power at the increasing rate during the first period. An increase of the assist power during the first period is substantially equal to a permissible maximum increase of the output of the generator during the first period.

According to a further aspect of the present invention, there is provided a control system a control system for controlling assist power from a power supply system to be fed to an electrically assisted supercharger for boosting a charge air in an engine. The power supply system has an engine-driven generator and a battery chargeable by an output of the generator. The control system includes an increasing rate setting unit configured to set an increasing rate during a first period at an early stage of the power assist. The control system includes an increasing it configured to increase the assist power at the increasing rate up to a predetermined constant level during the first period. The increasing rate of the assist power during the first period is substantially equal to a permissible maximum increase rate of the output of the generator during the first period.

According to a still further aspect of the present invention, there is provided a control system for controlling assist power from a power supply system to be fed to an electrically assisted supercharger for boosting a charge air in an engine. The power supply system has an engine-driven generator and a battery chargeable by an output of the generator. The control system includes an increasing rate setting unit configured to set an increasing rate during a first period at an early stage of the power assist The control system includes an increasing unit configured to increase the assist power at the increasing rate up to a predetermined constant level during the first period. The control system includes a control unit connected to the generator and configured to control the output of the generator based on a difference between a voltage of the power supply system and a target output of the generator at the early stage of the power assist. The first period is substantially equal to a delay time constant representing a period from a change of the voltage of the power supply system to control of the output of the generator based on the difference between the voltage of the power supply system and the target output of the generator.

According to a still further aspect of the present invention, there is provided a method of controlling power to be fed to a plurality of electrical loads from a power supply system having an engine-driven generator and a battery chargeable by an output of the generator. The method includes sensing a steep change in a load current flowing through at least one specific electrical load in the electrical loads. The method includes controlling the output of the generator based on the sensed steep change in the load current so as to reduce variations in a voltage of the power supply system while converging the voltage of the power supply system to a predetermined target voltage.

According to a still further aspect of the present invention, there is provided a method of controlling assist power from a power supply system to be fed to an electrically assisted supercharger for boosting a charge air in an engine. The power supply system has an engine-driven generator and a battery chargeable by an output of the generator. The method includes setting an increasing rate during a first period at an early stage of the power assist. The method includes increasing the assist power at the increasing rate during the first period. An increase of the assist power during the first period is substantially equal to a permissible maximum increase of the output of the generator during the first period.

BRIEF DESCRIPTION OF THE DRAWINGS

Other objects and aspects of the invention will become apparent from the following description of embodiments with reference to the accompanying drawings in which:

FIG. 9 is a time chart schematically illustrating the waveform of an assist request signal and that of assist power according to a third embodiment of the present invention;

DETAILED DESCRIPTION OF EMBODIMENTS OF THE INVENTION

First Embodiment

A first embodiment of the present invention will be described hereinafter with reference to FIGS. 1 to 3.

Figure 1:
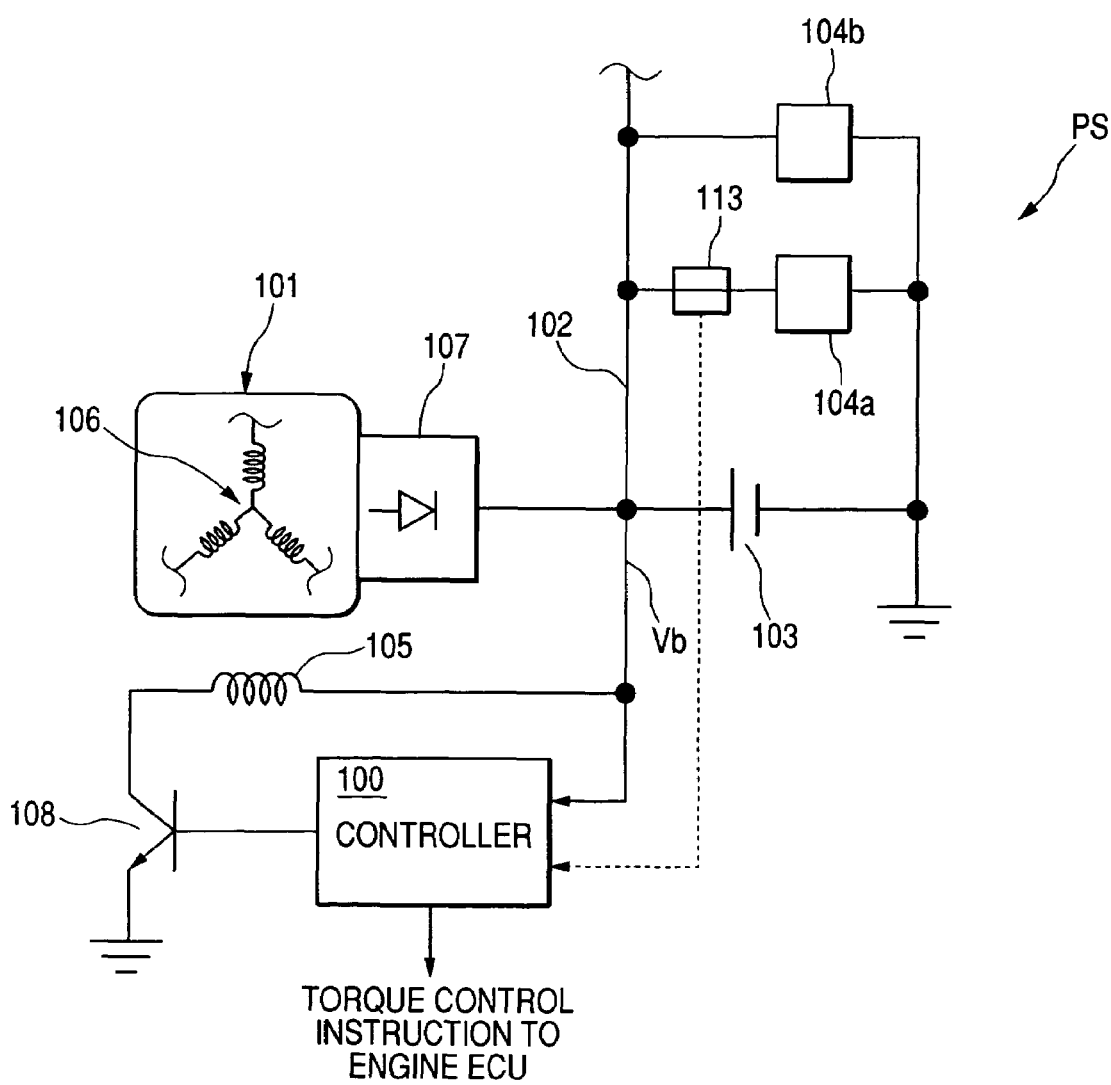
FIG. 1 is a circuit diagram schematically illustrating an example of the circuit structure of a power feeding system according to a first embodiment of the present invention.

FIG. 1 illustrates an example of the circuit structure of a power feeding system PS, which is installed in a vehicle, according to the first embodiment of the present invention.

The power feeding system PS is provided with an alternator 101 as an example of various types of generators. The power feeding system PS is also provided with a controller 100 for controlling the output (output power) of the alternator 101. The controller 100 can be composed of hardwired electronic circuits, a microcomputer programmed to perform the alternator output control operations, or the combination of them. The power feeding system PS is provided with a bus 102 for electric power transmission, a battery 103, vehicle electrical loads 104a and 104b, and a current sensor, such as a circuit transformer (CT), 113. In the first embodiment, the vehicle electrical load 104a causes a steep change in a load current flowing therethrough. The vehicle electrical load 104a is also refereed to as "steep change load". As the steep change loads, turbochargers, power steering systems, and the like can be applied.

In the first embodiment, for example, a steep change in a load current has an unignorable magnitude. In addition, the rate of a steep change in a load current flowing through an electrical load is expressed by 150 amperes (A) per second or thereabout. In addition, for example, the rate of a steep change in a load current flowing through an electrical load is substantially equal to 70 to 100 or 100 to 130 percent of the maximum alternator-output change rate. Moreover, the period of a steep change in a load current flowing through an electrical load is substantially equal to 70 to 100 percent or 100 to 130 percent of a delay time (delay time constant) required to execute the alternator output control (feedback control). For example, the delay time represents a period of time from a change (decrease) of the power supply voltage to control of the alternator output based on the difference between the power supply voltage and the target alternator output (see FIG. 2).

The current sensor 113 is electrically connected to the electrical load 104a in series. The battery 103, the electrical loads 104a and 104b are electrically connected to the bus 102 in parallel to each other. The battery 103 and the electrical loads 104a and 104b are electrically connected in common to the ground. The current sensor 113 is electrically connected to the controller 100 so that the controller 108 is operative to individually monitor whether a steep change in a load current flowing through the electrical load 104a.

The alternator 101 is electrically connected to the battery 103 and the electrical loads 104a and 104b through the bus 102. Note that many electrical loads are electrically connected to the bus 102, but they are not shown in FIG. 1.

The alternator 101 includes field windings (exciting windings) 105 provided in a rotor (not shown). The rotor is coupled to a crankshaft of an engine through a belt to be rotatable therewith. When a field current is applied to the field windings 105 of the rotor that is rotating, the rotating field windings 105 create magnetic fluxes. In addition, the alternator 101 includes three phase windings (stator windings) 106 provided in a stator that surrounds the rotor. The created magnetic fluxes by the field windings 105 induce a three-phase alternating current (AC) voltage in the stator windings 106.

In addition, the alternator 101 includes a rectifier 107 operative to rectify the induced three-phase AC voltage in the stator windings 106 to a direct current (DC) voltage. Moreover, the alternator 101 includes an NPN bipolar transistor 108 as an example of a regulator, whose collector is electrically connected to the field windings 105, whose emitter is electrically connected to the ground, and whose base is electrically connected to the controller 100. The transistor 108 is switched on and off based on control of the controller 100 so as to control the amount of field current.

The controller 100 is operative to apply a PWM signal with a predetermined duty to the base of the transistor 108 to turn it on and off based on the predetermined duty thereof using, for example, information input to the controller 100 from the exterior thereof. The controller 100 is also operative to send alternator-output control instruction (torque control instruction) to an engine ECU (not shown) operative to control the engine. The alternator-output control instruction allows the engine ECU to control the torque applied to the crankshaft so that the controller 100 allows the alternator output to be regulated to a desired level.

In addition, in the first embodiment, the bus 102 is electrically connected to the controller 100. This structure allows the controller 100 to detect a voltage Vb on the bus 102 representing a power supply voltage to be supplied to the electrical load 104a, 104b, . . . . In the first embodiment, the power supply voltage is equal to a voltage at a position close to the positive terminal of the battery 103.

Specifically, for example, when the alternator output voltage is less than the battery voltage (engine slow or not running for example), the direction of a current to flow is from the battery 103 to the electrical loads 104a, 104b, . . . , so that the battery 103 is discharged. Note that the rectifier 107 prevents the current flowing into the alternator 101.

In contrast, for example, when the alternator output voltage is greater than the battery voltage, a current flows from the alternator 101 to the electrical loads 104a, 104b, . . . , and the battery 103, so that the battery 103 is charged.

That is, in the power feeding system PS, detection of changes in the power supply voltage corresponding to the battery voltage with respect to the alternator output voltage allows the alternator output voltage to be regulated so as to maintain the battery voltage. In other words, the power feeding system PS carries out the alternator output control with maintenance of the battery voltage.

Note that the circuit structure and the operations of the alternator 101 have been well known, omitting further detailed descriptions of them.

Next, operations of controlling the alternator output performed by the controller 100 will be described hereinafter with reference to FIG. 2.

Figure 2:
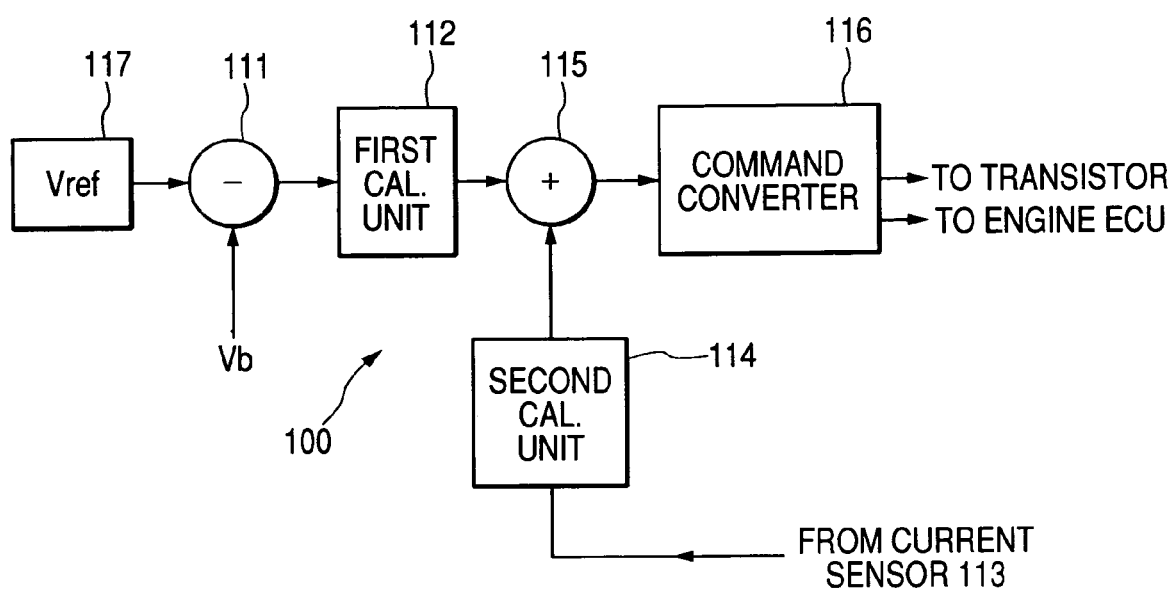
FIG. 2 is a block diagram schematically illustrating an example of the structure of a controller illustrated in FIG. 1.

FIG. 2 illustrates an example of the block diagram of the controller 100. Note that, if the controller 100 is designed to hardwired electronic circuits, the blocks 111, 112, and 114 to 117 can be realized by some of the hardwired electronic circuits. In addition, if the controller 100 is designed to a microcomputer, the blocks 111, 112, and 114 to 117 can be realized by functional modules and/or hardware components of the microcomputer.

As illustrated in FIG. 2, for example, a memory 117 of the controller 100 has stored therein a target output voltage Vref of the alternator 101. The target output voltage of the alternator 101 can be inputted to the controller 101 from the exterior thereof to be stored in the memory 117. For example, the target output voltage Vref can be controlled depending on the operating conditions of the engine.

A subtracting unit 111 of the controller 100 detects the power supply voltage Vb on the bus 102, and reads out the target output voltage Vref from the memory 117, thereby calculating the voltage difference (voltage deviation) between the power supply voltage Vb and the target output voltage Vref.

Next, a feedback alternator-output command calculating unit (first cal. unit) 112 of the controller 100 calculates the amount and the direction of first field current (first field current vector) If1 or the amount and the direction of first current (first current vector) I1 as a feedback alternator-output command value (first controlled variable) CV1. The amount and direction of the first field current If1 (the amount and direction of the first current I1) allows the voltage deviation between the power supply voltage Vb and the target output voltage Vref to converge to zero (0 V).

For example, when the power supply voltage Vb is lower than the target output voltage Vref (V<Vref), the amount of power requests of the electrical loads is higher than the alternator output, so that the battery voltage is discharged from the battery 103. The first field current If1 (the amount and direction of the first current I1) allows the alternator output to be controlled, thereby matching the power supply voltage Vb with the target output voltage Vref.

In contrast, when the power supply voltage Vb is higher than the target output voltage Vref (Vb>Vref), the amount of power requests of the electrical loads is lower than the alternator output, so that the battery 103 is charged based on the alternator output The first field current If1 (the amount and direction of the first current I1) allows the alternator output to be controlled, thereby matching the power supply voltage Vb with the target output voltage Vref.

In addition, in the first embodiment, the amount and the direction of the load current goad current vector) flowing through the steep change load 104a are, for example, constantly sensed by the current sensor 113. This allows, therefore, when the load current flowing through the steep change load 104a steeply changes, the controller 100 to receive detection data representing the sensed amount and direction of the steep change of the load current.

A feedforward alternator-output command calculating unit (second cal. unit) 114 of the controller 100 calculates, as a feedforward alternator-output command value (second controlled variable) CV2, the amount and the direction of second field current If2 or the amount and the direction of second current I2 based on the amount and direction of sensed load current change. The amount and direction of second field current If2 or those of second current I2 correspond to the amount and direction of the sensed load current change.

Next, an adder 115 of the controller 100 calculates, as the amount and the direction of a total current or a total field current, the sum (vector sum) of the feedback alternator-output command value CV1 and the feedforward alternator-output command value CV2. The adder 115 sends, as a total alternator-output command value (total controlled variable) CV3, the calculated total current vector or the total field current vector to a command converter 116.

The command converter 116 receives the total alternator-output command value CV3 sent from the adder 115, and converts the total alternator-output command value CV3 into a PWM signal with a predetermined duty corresponding thereto, thereby applying the PWM signal to the base of the transistor 108.

The transistor 108 is therefore turned on and off based on the predetermined duty of the PWM signal, thereby controlling the alternator output.

In addition, for example, the adder 115 of the controller 100 sends the total alternator-output command value CV3 to the engine ECU. The engine ECU receives the total alternator-output command value CV3, and the command value CV3 requires the engine ECU to regulate the amount of fuel supply to the engine so as to allow the engine to generate torque applied to the crankshaft; the torque corresponds to the total alternator-output command value CV3.

Therefore, the alternator output current is substantially equivalent to the total current vector.

As set forth above, in the first embodiment, even if the load current flowing through the steep change load 104a steeply varies, the calculating unit 114 instantaneously calculates the feedforward alternator-output command value CV2 corresponding to the amount and direction of the steep change of load current sensed by the current sensor 113.

Because changes in the alternator output have a direct correlation to the amount and direction of field current, control of the amount and direction of field current allows the alternator output to instantaneously follow the amount and direction of a steep change of the load current.

This makes it possible to improve the response of the alternator output to the steep change of the load current, thereby controlling charge and discharge of the battery 103 and changes in the power supply voltage against the steep change of the load current Moreover, it is possible to reduce an unbalance between the alternator output and the amount of a steep change in the load current flowing through the load 104a.

In addition, because the controller 108 executes the alternator output control with maintenance of the power supply voltage Vb (see reference numerals 111 and 112 in FIG. 2), it is unnecessary to accurately match the output change of the alternator 304 with the steep change in the load current flowing through the load 104a.

Moreover, when no steep change occurs in the load current flowing through the load 104a, it is possible to execute the alternator output control with maintenance of the power supply voltage Vb. This allows the battery voltage to be stably maintained under any conditions of each of the electrical loads. This makes it possible to prevent the battery 105 from excessively charging and discharging, thereby lengthening the battery life, and to improve the stability of the power supply voltage, thereby smoothly operating the electrical loads.

Moreover, in the first embodiment, during any period in which no steep change occurs in the load current flowing through the load 104a, the controller 108 can execute "field-current reduction alternator output control" described in the Description of the Related Art.

Specifically, in the first embodiment, the controller 108 additionally controls the alternate output only in response to a steep change in the load current of the load 104a. This allows the alternator output control for a steep change in the load current of the load 104a not to affect various types of the alternator output control, which have been applied to the system PS. In addition, it is easy to simply and accurately determine an amount of regulation of the alternator output, which is additionally required.

In the first embodiment, the current sensor 113 senses the amount and direction of a steep change of the load current flowing through the steep change load 104a, and the controller 100 regulates the amount and direction of the field current based on the sensed amount and direction of the steep change of the load current. The present invention, however, is not limited to the structure.

Specifically, when the amount of the steep change of the load current flowing through the load 104a is substantially constant to be previously stored in the controller 100, a current-direction sensor may be provided for sensing a direction of a steep change of the load current in place of the current sensor 113. The current-direction sensor has a size smaller than that of the current sensor 113, and the cost of the current-direction sensor is cheaper than that of the current sensor 113.

That is, in this first modification of the first embodiment, it is possible to regulate the amount and direction of the field current based on the sensed direction and stored amount of the steep change of the load current without using the current sensor 113. This makes it possible to downsize the circuit structure of the power feeding system PS, and to reduce the cost thereof.

Note that the controller 100 can receive the amount and direction of the steep change of the load current flowing through the steep change load 104a from a control circuit (not shown) operative to control the operations of the load 104a; these operations include start and stop operations of the load 104a.

In the first embodiment and the first modification, the alternator 101 is applied for a generator, but a magnetogenerator can be applied for the alternator.

Figure 3:
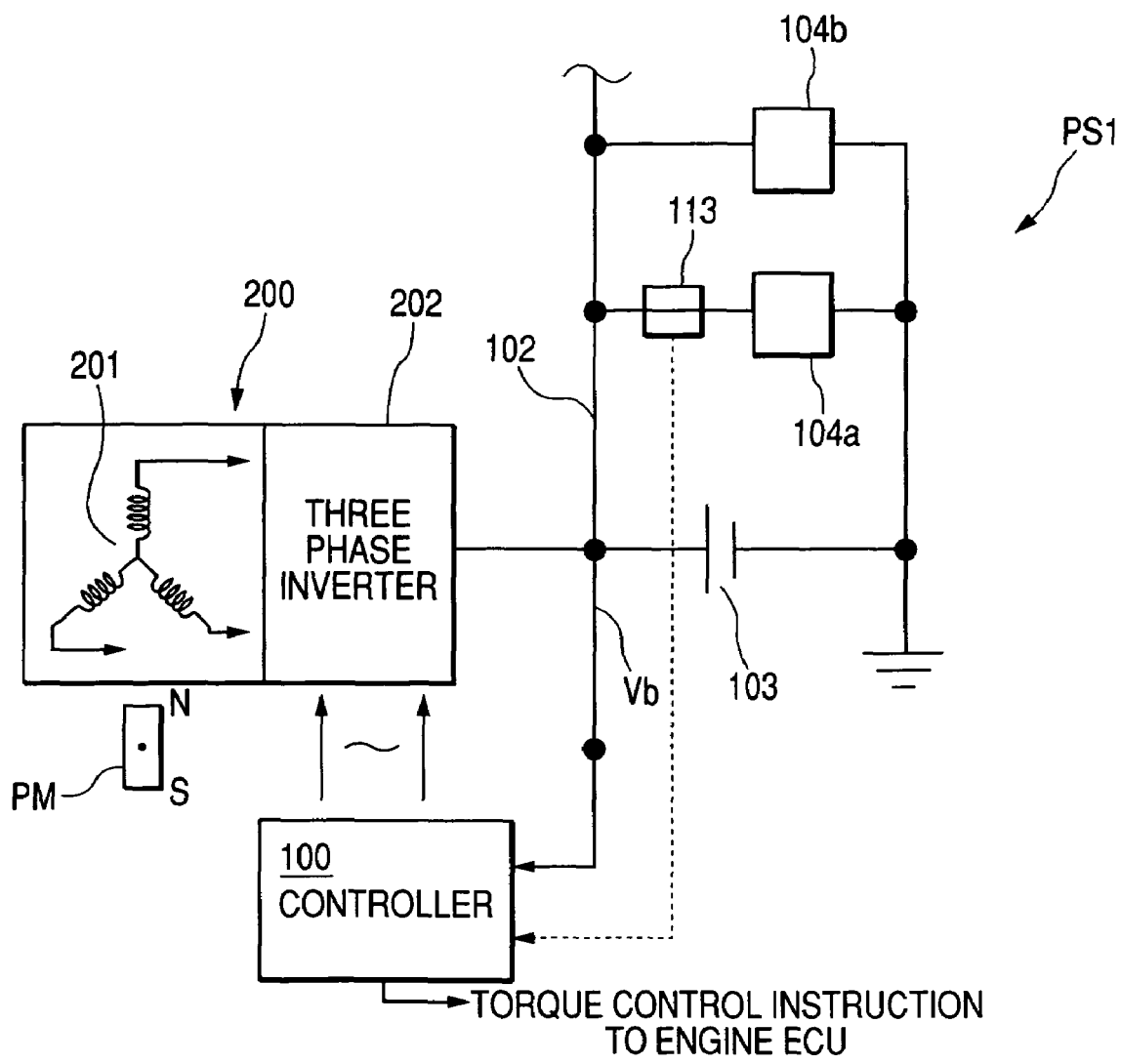
FIG. 3 is a circuit diagram schematically illustrating an example of the cut structure of a power feeding system according to a second modification of the first embodiment of the present invention.

FIG. 3 illustrates an example of the circuit structure of a power feeding system PS1, which is installed in a vehicle, according to a second modification of the first embodiment of the present invention. Note that elements of the power feeding system PS1 according to the second modification, which are substantially identical to those of the power feeding system PS according to the first embodiment shown in FIG. 1, are represented by the same reference characters as in FIG. 1. The descriptions of the elements of the power feeding system PS1 according to the second modification are therefore omitted or simplified.

The power feeding system PS1 according to the second modification is provided with a magnetogenerator 200 in place of the alternator 101. The magnetogenerator 200 is provided with a permanent magnet rotor PM without the field windings, which serves as the rotor of the alternator 101

The magnetogenerator 200 includes three phase windings (stator windings) 201 provided in a stator that surrounds the rotor. The created magnetic fluxes by the permanent magnet rotor PM induce a phase AC voltage in the stator windings 201.

In addition, the magnetogenerator 200 includes a three-phase inverter 202 having a plurality of switching elements, such as transistors, and operative to convert the induced three-phase AC voltage in the stator windings 201 to a DC voltage. In addition, the three-phase inverter 202 is operative to cause a three-phase alternating current to flow into the stator windings 201. The three-phase alternating current controls torque created by the stator windings 201. Each of the switching elements of the inverter 202 is electrically connected to the controller 100. Each of the switching elements of the inverter 202 is switched on and off based on control of the controller 100 so as to control the magnitude of the DC voltage.

Specifically, the controller 100 is operative to individually apply PWM signals with different duties to the switching elements of the inverter 202 to individually turn them on and off based on the predetermined duties thereof.

That is, in the second modification, the command converter 116 receives the total alternator-output command value CV3 sent from the adder 115, and converts the total alternator-output command value CV3 into PWM signals each with a predetermined duty corresponding thereto, thereby individually applying the PWM signals to the switching elements of the inverter 202.

The switching transistors of the inverter 202 are therefore individually turned on and off based on the predetermined duties of the PWM signals, making it possible to control the output voltage of the magnetogenerator 200.

In the first embodiment and its modifications, the controller 100 controls the output of the alternator (generator) in response to a sudden change of the load current, but the present invention is not limited to the structure.

That is, in a third modification of the first embodiment, the controller 100 can control output torque of the alternator (generator) in response to a sudden change of the load current.

Specifically, in FIGS. 1 and 2, the controller 100 is configured to obtain the number of revolutions of the rotor of the alternator (generator) based on, for example, the engine revolutions (engine speed).

In addition, in the third modification, the feedback alternator-output command calculating unit 112 calculates first output torque as the feedback alternator-output command value CV1. The output torque of the alternator allows the voltage deviation between the power supply voltage Vb and the target output voltage Vref to converge to zero.

Similarly, the feedforward alternator-output command calculating unit 114 calculates, as a feedforward alternator-output command value CV2, second output torque corresponding to the amount and direction of the sensed load current change.

The adder 115 of the controller 100, therefore, calculates, as total output torque, the sum of the feedback alternator-output command value CV1 and the feedforward alternator-output command value CV2. The adder 115 sends, as a total alternator-output command value CV3, the calculated total torque to a command converter 116. The command converter 116 receives the total alternator-output command value CV3 sent from the adder 115, and converts the total alternator-output command value CV3 into a PWM signal(s) with a predetermined duty corresponding thereto, thereby applying the PWM signal(s) to the transistor 108 (switching elements of the inverter 202).

As described above, in the third modification of the present invention, like the first embodiment, it is possible to control charge and discharge of the battery 103 and changes in the power supply voltage against the steep change of the load current.

Second Embodiment

A second embodiment of the present invention will be described hereinafter with reference to FIGS. 4 to 7.

Figure 4:
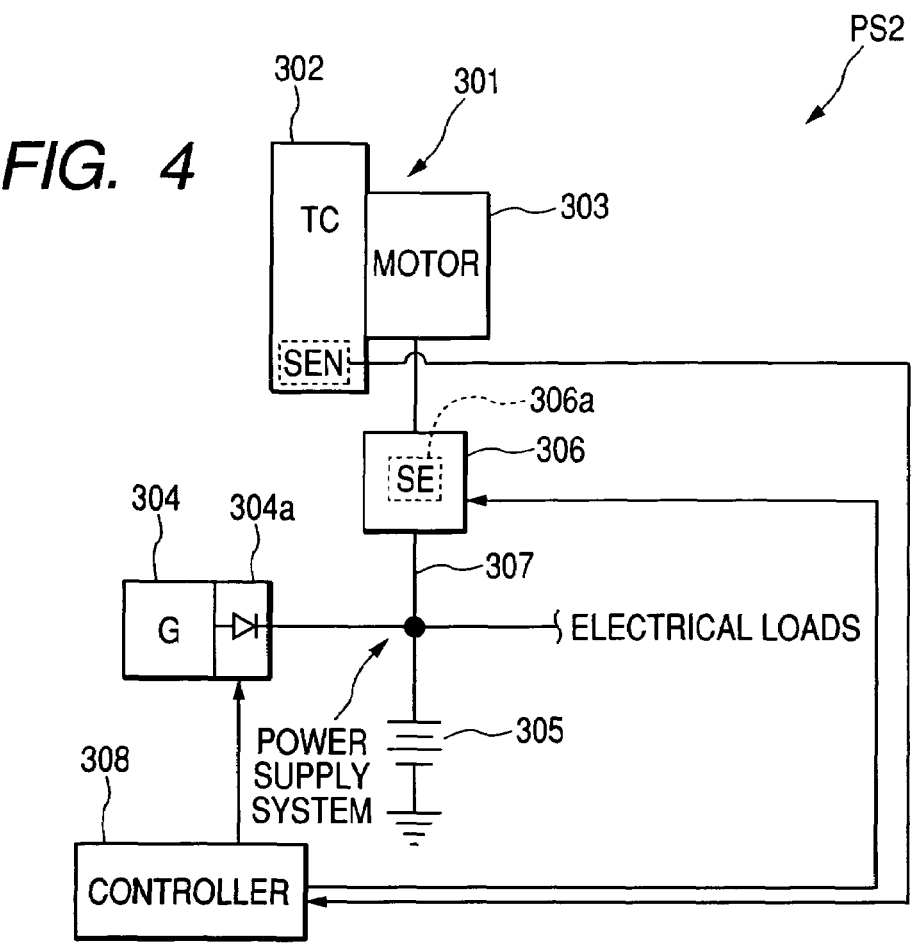
FIG. 4 is a circuit diagram schematically illustrating an example of the electric system of a power feeding system according to a second embodiment of the present invention.

FIG. 4 illustrates an example of the electric system of a power feeding system PS2, which is installed in a vehicle, for feeding power to an electrically assisted turbocharger 301 as one of the vehicle electrical loads according to the second embodiment of the present invention.

The electrically assisted turbocharger 301 is provided with a turbocharger 302 and a three-phase synchronous motor 303 directly coupled to a common rotating shaft of the turbocharger 302.

For example, the turbocharger 302 includes a turbine (turbine wheel) coupled to one end of the rotating shaft, which is arranged to be subjected to the exhaust gas of the engine. The turbocharger 302 also includes a compressor (compressor wheel) coupled to the other end of the rotating shaft.

Specifically, the turbine of the turbocharger 302 is operative to rotate based on wasted energy in the exhaust gas of the engine, and the rotation of the turbine and the rotating shaft allows the compressor of the turbocharger 302 to boost charge air in the engine In addition, the turbocharger 302 is equipped with various kinds of sensors SEN, which are electrically connected to the controller 308. For example, as sensors SEN, a pressure sensor is disposed close to the compressor of the turbocharger 302, and is operative to sense a charging pressure Pr corresponding to a discharge pressure of the compressors thereby sending the sensed charging pressure Pr to the controller 308.

In addition, the sensors SEN includes a sensor disposed close to the rotating shaft of the turbocharger 302 and configured to detect the number of revolutions of the rotating shaft, thereby sending the detected number of revolutions of the rotating shaft to the controller 308. The sensors SEN also includes a sensor disposed close to the compressor of the turbocharger 302 and configured to sense a boost pressure thereof, thereby sending boost pressure information representing the sensed boost pressure to the controller 308.

The power feeding system PS2 is also provided with an alternator 304 with a rectifier 304a, a battery 305, an inverter 306, a power supply bus 307 for electric power transmission, and a controller 308.

The battery 305, the inverter 306, and the motor 303 are electrically connected to the power supply bus 307. Note that many electrical loads are electrically connected to the bus 307, but they are not shown n FIG. 4.

The alternator 304 is electrically connected to the battery 305 and the electrically assisted turbocharger 301 through the bus 307.

The alternator 304 has substantially the same structure as that of the alternator 101 according to the first embodiment.

Specifically, the alternator 304 includes field windings provided in a rotor (not shown). The rotor is coupled to a crankshaft of an engine (not shown) through a belt to be rotatable therewith. When a field current is applied to the field windings of the rotor that is rotating, the rotating field windings create magnetic fluxes. In addition, the alternator 304 includes three phase windings (stator windings) provided in a stator that surrounds the rotor. The created magnetic fluxes by the field windings induce a three-phase AC voltage in the stator windings.

In addition, the rectifier 304a of the alternator 304 is operative to rectify the induced three-phase AC voltage in the stator windings to a DC voltage, thereby feeding the DC power through the bus 307. Moreover, the alternator 304 includes a transistor as an example of a regulator electrically connected to the controller 308. The transistor is switched on and off based on control of the controller 308 so as to control the amount of field current.

The controller 308 can be composed of hardwired electronic circuits, a microcomputer programmed to perform the alternator output control operations, or the combination of them.

Specifically, the controller 308 is operative to apply a PWM signal with a predetermined duty to the base of the transistor to tun it on and off based on the predetermined duty thereof using, for example, information input to the controller 308 from the exterior thereof.

The inverter 306 is a three-phase inverter having a plurality of switching elements 306a, such as transistors, and is operative to convert the DC power applied through the bus 307 to a three-phase AC power and to feed the three-phase AC power to the thee-phase synchronous motor 303, thereby making it operate. In addition, the inverter 306 is operative to rectify a three-phase AC power generated by the motor 303 to a DC power and to feed the DC power through the bus 307. Each of the switching elements 306a of the inverter 306 is electrically connected to the controller 308. Each of the switching elements 306a of the inverter 306 is switched on and off based on control of the controller 308 so as to control the magnitude of the AC voltage and/or the DC voltage.

Specifically, the controller 308 is operative to individually apply PWM signals with different duties to the switching elements 306a of the inverter 306 to individually turn them on and off based on the predetermined duties thereof.

Like the first embodiment, for example, when the alternator output voltage is less than the battery voltage (engine slow or not running for example), the direction of a current to flow is from the battery 305 to the electrical loads including the electrically assisted turbocharger 301, . . . , so that the battery 305 is discharged. Note that the rectifier 304a prevents the current flowing into the alternator 304.

In contrast, for example, when the alternator output voltage is greater than the battery voltage, a current flows from the alternator 304 to the electrical loads, . . . , and the battery 305, so that the battery 305 is charged.

That is, like the first embodiment, in the power feeding system PS2, detection of changes in the power supply voltage corresponding to the battery voltage with respect to the alternator output voltage allows the alternator output voltage to be regulated so as to maintain the battery voltage. In other words, the power feeding system PS2 carries out the alternator output control (feedback control) with maintenance of the battery voltage (see the reference characters 111 and 112 in FIG. 2 in the first embodiment).

Moreover, for example, the controller 308 includes a memory or an other similar storage unit in which the maximum permissible power value to which a power supply system is accessible has been stored; this power supply system corresponds to circuitry composed of the alternator 304, the battery 305, and the electrical loads including the electrically assisted turbocharger 301. In addition, for example, the memory has stored therein a limit power value Path, which has been predetermined such that the limit power value Path is not more than the maximum permissible power value. Moreover, the memory has stored therein a predetermined target charging pressure value Pp, which is a target discharging pressure for the compressor of the turbocharger 302, and a predetermined threshold pressure value $\Delta$Pth.

In the second embodiment, the controller 308 is configured to receive a throttle potentiometer signal representing the degree of the driver's press of an accelerator (accelerator pedal), in other words, the position of the accelerator, and sent from a throttle potentiometer (throttle position sensor). The controller 308 is configured to detect the magnitude and/or increasing rate of the degree of the driver's press of the accelerator based on the received throttle potentiometer signal. Note that an electronic control unit (ECU), such as an engine ECU, can receive the throttle potentiometer signal and detect the magnitude and/or the rate of the degree of the driver's press of the accelerator.

In the second embodiment, when an assist request for assistance to the motor 303 is input to the controller 308 or is generated by the controller 308, the controller 308 makes the motor 303 operate to assist the rotational driving force of the turbocharger 302, thereby increasing an intake air mass into the engine. This allows the acceleration performance of the vehicle to increase.

Figure 5:
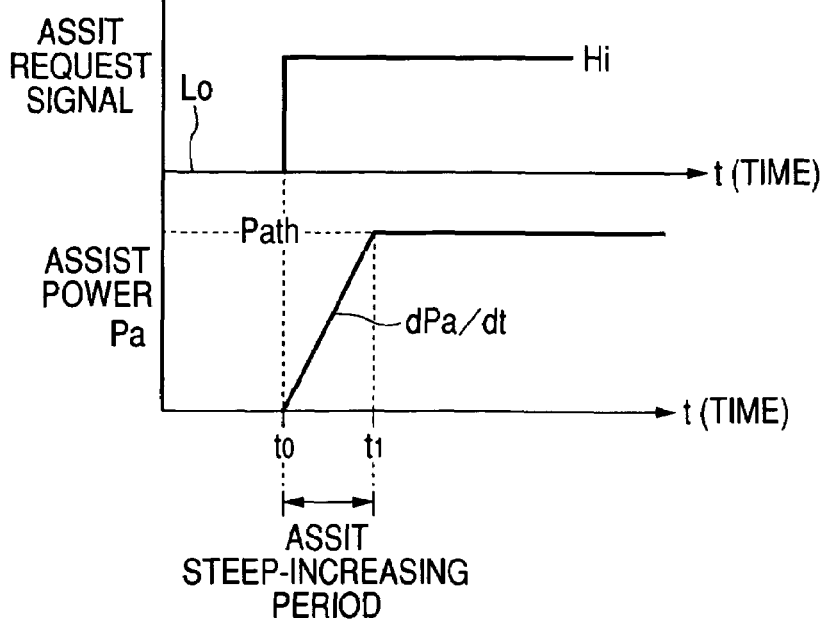
FIG. 5 is a time chart schematically illustrating the waveform of an assist request signal and that of assist power according to the second embodiment.

Next, operations of the assist control of the controller 308 set forth above will be described hereinafter with reference to a time chart illustrated in FIG. 5.

When the assist request is input to the controller 308 or is generated by the controller 308 at a time t0, the controller 308 controls the switching elements 306a of the inverter 306 based on duties so as to cause the inverter 306 to feed assist power Pa as assist energy to the motor 303; the assist power Pa increases at a power increasing rate (dPa/dt), where t represents time.

The motor 303 receives the assist power Pa and electrically assists the turbocharger 302 by rotating the rotating shaft thereof based on the assist power Pa.

Next, when detecting that the assist power Pa reaches the limit power value Path at a time t1 by referring to the memory, the controller 308 controls the switching elements 306a of the inverter 306 based on duties so as to lock the assist power Pa to the limit power value Path. As a result, thereafter, the motor 303 electrically assists the turbocharger 302 by rotating the rotating shaft thereof based on the assist power Path.

Note that, as described above, the controller 308 generates the assist request for assistance to the motor 303 when determining that the magnitude and/or rate of the received throttle potentiometer signal exceeds a corresponding predetermined level. Moreover, the controller 308 can detect the assist request for assistance to the motor 303 when receiving a signal representing that the magnitude and/or rate of the throttle potentiometer signal exceeds a corresponding predetermined level from, for example, the engine ECU.

In addition, after the generation of the assist request, when the number of revolutions of the turbocharger 302 and/or the boost pressure exceeds a corresponding predetermined threshold value, the controller 308 (or the engine ECU) can stop generation of the assist request.

Next, operations of the assist control of the controller 308 set forth above will be described hereinafter in more detail with reference to a flow chart illustrated in FIG. 6.

When receiving or generating the assist request (the determination in step S100 is YES in FIG. 6), the controller 308 reads the charging pressure value Pr sensed by the pressure sensor and sent therefrom (step S101). The controller 38 reads out the target charging pressure value Pp from the memory, and calculates a pressure difference $\Delta$P between the target charging pressure Pp and the charging pressure value Pr in step S102.

Note that, in the second embodiment, the controller 308 reads out the target charging pressure value Pp from the memory, but the present invention is not limited to the structure. Specifically, target charging pressures have been stored in the memory such that they are associated with corresponding degrees of the driver's press of the accelerator and/or corresponding rates of the degrees thereof. The controller 308 can therefore search one of the target charging values corresponding to the magnitude and/or increasing rate of the degree of the driver's press detected by the throttle potentiometer.

In addition, the controller 308 can calculate the target charging pressure based on the engine revolutions and the vehicle speed in addition to the magnitude and/or increasing rate of the degree of the driver's press detected by the throttle potentiometer.

After the step S102, the controller 308 reads out the threshold pressure value Pth from the memory in step S103, and determines whether the pressure difference $\Delta$P exceeds the threshold pressure value Pth in step S104.

When it is determined that the pressure difference $\Delta$P is less than the threshold pressure value Pth (the determination in step S104 is NO), the controller 308 terminates the operations.

When it is determined that the pressure difference $\Delta$P is equal to or more an the threshold pressure value Pth (the determination in step S104 is YES), the controller 308 determines whether the assist power Pa that should be outputted to the inverter 6 reaches the limit power value Path in step S106.

When it is determined that the assist power Pa reaches the limit power value Path (the determination in step S106 is YES), the switching elements 306a of the inverter 306 have been controlled by the controller 308 based on duties so as to feed the assist power Pa that is locked to the limit power value Path to the motor 303. For this reason, the controller 308 shifts to step S110.

In contrast, when it is determined that the assist power Pa does not reach the limit power value Path (the determination in step S106 is NO), the controller 308 controls the switching elements 306a of the inverter 306 based on duties so as to add power increases ΔPa to the assist power Pa, thereby considering the sum of the assist power Pa and the power increases ΔPa to be the assist power Pa in step 8108. That is, the controller 308 adjusts the power increases ΔPa to control the increasing rate (dPa/dt) of the assist power Pa in step S108.

In step S110, the controller 308 controls the switching elements 306a of the inverter 306 based on duties so as to cause the inverter 306 to feed the assist power Pa to the motor 303 in step S110, returning to step S100.

Figure 6:
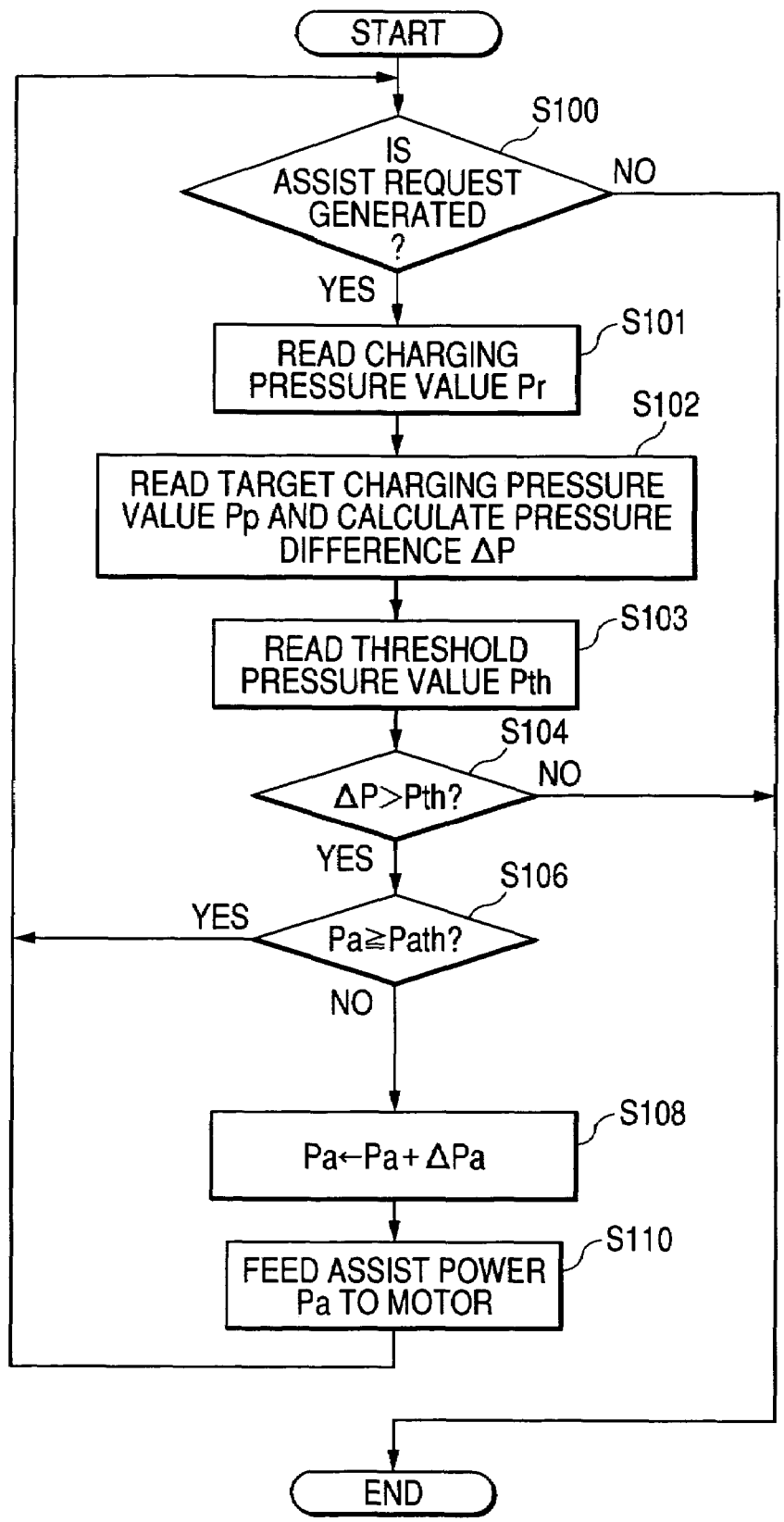
FIG. 6 is a flowchart schematically illustrating operations of a controller illustrated in FIG. 4 according to the second embodiment.

The routine from step S100 to step S110 illustrated in FIG. 6 is repeated until the determination in step S104 is NO. The period of time reed to execute one cycle of the routine has been adjusted to a predetermined period of time.

The repeated operations of the routine by the controller 308 allows control of the assist power Pa.

As described above, in the second embodiment of the present invention, when the assist request is generated, the controller 308 causes the inverter to feed the assist power Pa to the motor 303 while increasing it at the predetermined increasing rate. After the assist power Pa has reached the limit power value Path, the controller 308 causes the inverter 306 to feed the limit power value Path to the motor 303.

The effects obtained by the structure and operations of the second embodiment will be described hereinafter in detail with reference to FIG. 7.

Figure 7:
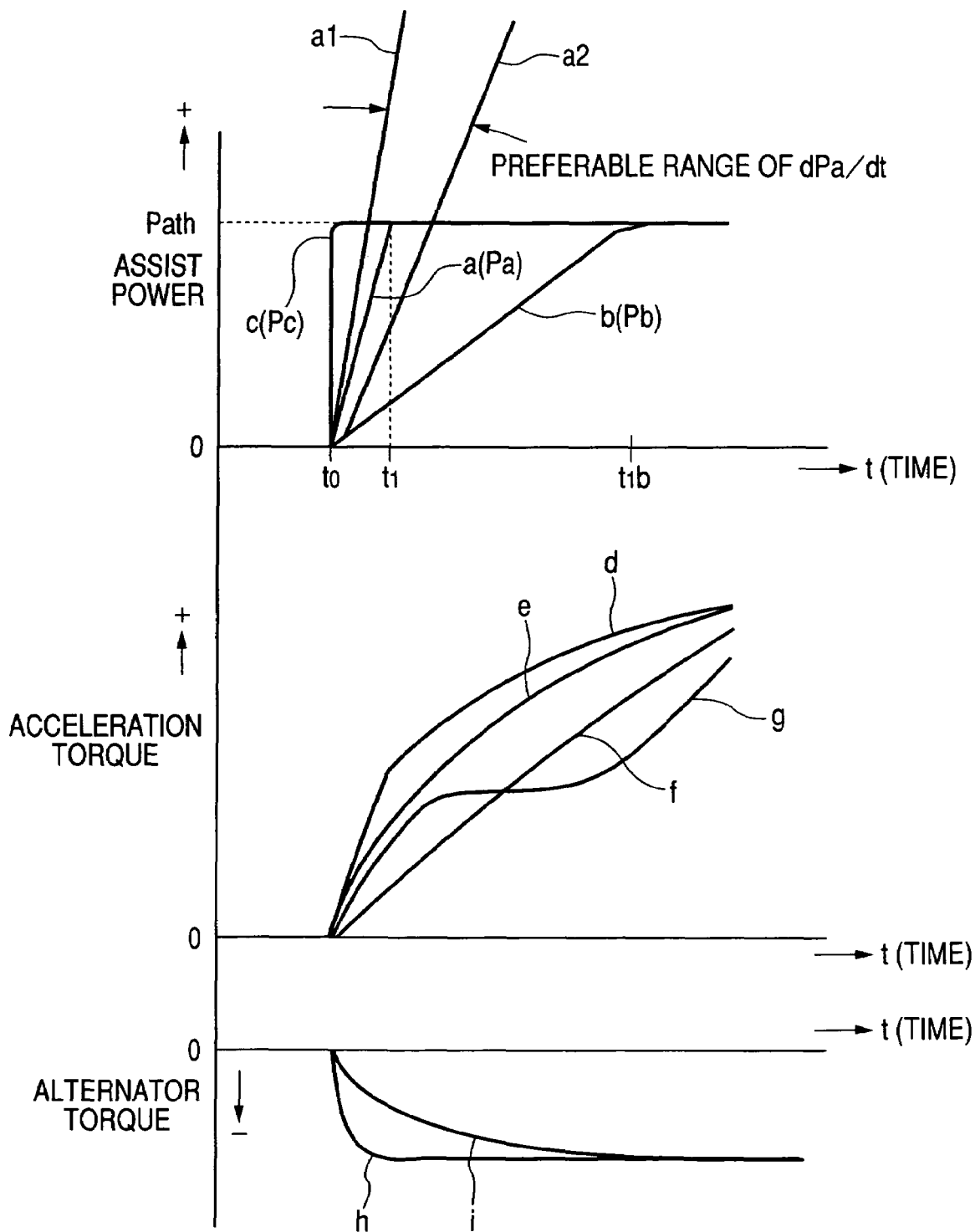
FIG. 7 is a time chart schematically illustrating the waveforms of pieces of assist power, the waveforms of pieces of acceleration torque, and those of pieces of alternator torque according to the second embodiment.

In FIG. 7, the reference character "a" represents the waveform of the assist power Pa that increases at the predetermined increasing rate dPa/dt during a period of time (t1-t0) according to the second embodiment. The period of time (t1-t0) is referred to as "assist steep-increasing period". In addition, in FIG. 7, the reference character "b" represents the waveform of assist power Pb that increases at another power increasing rate that is lower than the predetermined power increasing rate of the assist power Pa during a period of time (t1b-t0). The period of time (t1b-t0) is referred to as "assist graduate-increasing period". Moreover, in FIG. 7, the reference character act represents the waveform of assist power Pc that instantaneously rising at the time t0 at which the assist request is generated.

Note that the waveform represented by the character "a" is referred to as "steep-increase waveform", the waveform represented by the character "b" is referred to as "graduate-increase waveform", and the waveform represented by the character "c" is referred to as "instant-rising waveform".

In addition, in FIG. 7, the reference character "d" represents the waveform of vehicle accelerating torque when feeding the assist power Pa with the steep-increase waveform "a" from the battery 305, and the reference character "e" represents the waveform of vehicle accelerating torque when feeding the assist power Pb with the graduate-increase waveform "b" from the battery 305.

Moreover, the reference character "f" represents the waveform of vehicle accelerating torque when feeding the assist power Pa with the steep-increase waveform "a" from the alternator 304, and the reference character "g" represents the waveform of vehicle accelerating torque when feeding the assist power Pb with the graduate-increase waveform "b" from the alternator 304.

Furthermore, the reference character "h" represents the waveform of alternator torque when feeding the assist power Pa with the steep-increase waveform "a", and the reference character "i" represents the waveform of alternator torque when feeding the assist power Pb with the graduate-increase waveform "b". In the first embodiment, note that the "alternator torque" means engine load torque required to drive the alternator 304.

When feeding the assist power Pa with the steep-increase waveform "a" from the battery 305, because the engine need not generate the alternator torque, the waveform of the vehicle accelerating torque becomes the waveform "d". This enables the vehicle accelerating torque to increase with high response to the assist request The assist power feeding manner set forth above may however need discharge of the battery 305 and, thereafter charge thereof. In addition, the power supply voltage corresponding to the potential on the power supply bus 307 may drop during the feeding of the assist power Pa, which may cause the other electrical loads to malfunction.

Next, when feeding the assist power Pb with the graduate-increase waveform "b" from the battery 305, because the engine need not generate the alternator torque, the waveform of the vehicle accelerating torque becomes the waveform "e". This allows the vehicle accelerating torque to increase with high response to the assist request, which is slightly lower than the response to the assist request when feeding the assist power Pa with the steep-increase waveform "a" from the battery 305. The assist power feeding manner set forth above may however need discharge of the battery 305 and, thereafter, charge thereof. Similarly, the power supply voltage corresponding to the potential on the power supply bus 307 may drop during the feeding of the assist power Pa1.

Next, when feeding the assist power Pa with the steep-increase waveform "a" from the alternator 304, because the engine need generate the alternator torque "h", the waveform of the vehicle accelerating torque becomes the waveform "f". This enables the vehicle accelerating torque to increase with high response to the assist request even though the response thereto is slightly lower than the response when feeding the assist power Pa with the steep-increase waveform "a" from the battery 305. In addition, the assist power feeding manner set forth above can avoid discharge and charge of the battery 305, making it possible to reduce the burden of the battery 305, and to prevent the potential on the bus 307 from dropping.

Next, when feeding the assist power Pb with the graduate-increase waveform "b" from the alternator 304, because the engine need generate the alternator torque "i", the waveform of the vehicle accelerating torque becomes the waveform "g". This may cause the response of the vehicle accelerating torque to the assist request to deteriorate. This may be due to the fact that the waveform "b" of the assist power Pb gradually rises, and that, because the increasing rate of the vehicle accelerating torque is represented by subtracting the increasing rate of alternator torque from the increasing rate of engine torque, the vehicle accelerating torque deteriorates in the course of increase of the vehicle accelerating torque.

It follows from what has been described that, in order to reduce the burden of the bath 305 and to prevent the power supply voltage on the bus 307 from decreasing while preventing the increasing response of the vehicle accelerating torque from deteriorating, it is necessary to make the alternator 304 feed the assist power Pa while increasing the assist power Pa at the predetermined increasing rate at early stages of the power assist.

The effects obtained by making the assist power Pa rise such that the assist power Pa has the steep-increasing waveform "a" will be more specifically described hereinafter.

For ease of description, it is assumed that the number of evolutions of the engine is set to be fixed to approximately 12000 rpm.

The output P of the alternator 304 and the alternator torque Talt, which is converted as engine load torque required to drive the alternator 304 have a predetermined relationship therebetween represented by the following equation:

$$Talt = K2 \times P$$

where K2 represents an arbitrary constant

The equation permits the alternator torque to be assumed to be proportional to the alternator output.

In addition, increase Tadd of engine's torque by turbocharging of the turbocharger 301 is represented as the following equation:

$$Tadd = K1 \times \int P dt$$

where K1 represents an arbitrary constant.

Specifically, the increase Tdd of engine's torque can be assumed to be proportional to a total cumulative amount of the alternator output during the rising period of the waveform "a" of the assist power Pa This permits the vehicle acceleration torque while the alternator 304 generates power to be represented as "Tadd−Talt". When the jerk value "d(Tadd−Talt)/dt" is positive, that is, the equation "d(Tadd−Talt)/dt>0" holds, it is possible to allow the driver and/or passengers in the vehicle to notice continued acceleration while the alternator 304 generates power.

Specifically, when the alternator torque Talt is raised up to a steady-state value during 0.5 seconds and below, the jerk value thereafter is constantly positive, which can provide smooth acceleration feeling to the driver and/or passengers in the vehicle.

On the other hand, feeding the assist power Pc with the instant-rising waveform "c" from the alternator 304 can provide the highest increasing response of the vehicle acceleration torque to the assist request in all cases using the assist power Pa, the assist power Pb, and the assist power Pc.

Using the assist power Pc with the instant-rising waveform "c" may however cause a large amount of discharge from the battery 305 to abruptly occur so that the power supply voltage on the bus 307 drops.

As described above, the alternator output control (feedback control) of the alternator output for maintaining the battery voltage due to power feeding to the electrically assisted turbocharger 301 from the battery 305 has a predetermined delay time. For example, the delay time represents a period of time from a change (decrease) of the power supply voltage to control of the alternator output based on the difference between the power supply voltage and the target alternator output (see FIG. 2). The delay time is referred to as "delay time constant".

When the increasing rate of the assist power is excessively high like the assist power Pc, increase of the alternator output by the feedback control may not follow the increase of the assist power due to the delay time. This may decrease in the power supply voltage and/or increase in discharge of the battery 305, which may cause the other electrical loads to malfunction.

It follows from what has been described that, in the second embodiment, in step S108, the controller 308 sets the increasing rate of the assist power Pa at the early stages of the power assist to the electrically assisted turbocharger 301 to be within the range given by a predetermined first increasing rate "a1" and a predetermined second increasing rate "a2" in FIG. 7, which can effectively prevent the problems set forth above. The first and second increasing rates a1 and a2 are set to be lower than the increasing rate of the assist power Pc and higher than that of the assist power Pb, and the second increasing rate a2 is higher than the first increasing rate a1.

Preferably, an increasing rate of the assist power Pa during the assist steep-increasing period within the range between the first and second increasing rates a1 and a2 is set to be substantially equal to the increasing rate of the alternator output, which is maximally obtained during the assist steep-increasing period. In other words, an increase of the assist power Pa during the assist steep-increasing period, whose increasing rate included within the range between the first and second increasing rates a1 and a2, is set to be substantially equal to the maximum increase of the alternator output during the assist steep-increasing period.

In the second embodiment, this sentence "increase (increasing rate) of the assist power Pa during the assist steep-increasing period is substantially equal to the maximum increase (maximum increasing rate) of the alternator output during the assist steep-increasing period" means that "the increase (increasing rate) of the assist power Pa during the assist steep-increasing period is 70 to 100 or 100 to 130 percent (70 to 130 percent) of the maximum increase (maximum increasing rate) of the alternator output during the assist steep-increasing period.

Note that the controller 308 can determine the increasing rate of the power assist Pa during the assist steep-increasing period by dividing the increase of the assist power Pa during the assist steep-increasing period by the length of the assist steep-increasing period. Similarly, the controller 308 can determine the increasing rate of the alternator output by dividing the increase of the alternator output during the assist steep-increasing period by the length of the assist steep-increasing period.

This improves the acceleration response to the assist requirement while preventing discharge of the battery 305 and decrease of the power supply voltage.

In addition, preferably, the first and second increasing rates a1 and a2 are set such that the assist steep-increasing period (t1-t0) is substantially equal to the delay time (delay time constant) required to execute the alternator output control (feedback control).

The sentence "the assist steep-increasing period is substantially equal to the delay time (delay time constant)" means that "the assist steep-increasing period is 70 to 100 or 100 to 130 percent (70 to 130 percent) of the delay time (delay time constant).

This also improves the acceleration response to the assist requirement while preventing discharge of the battery 305 and decrease of the power supply voltage.

Figure 8:
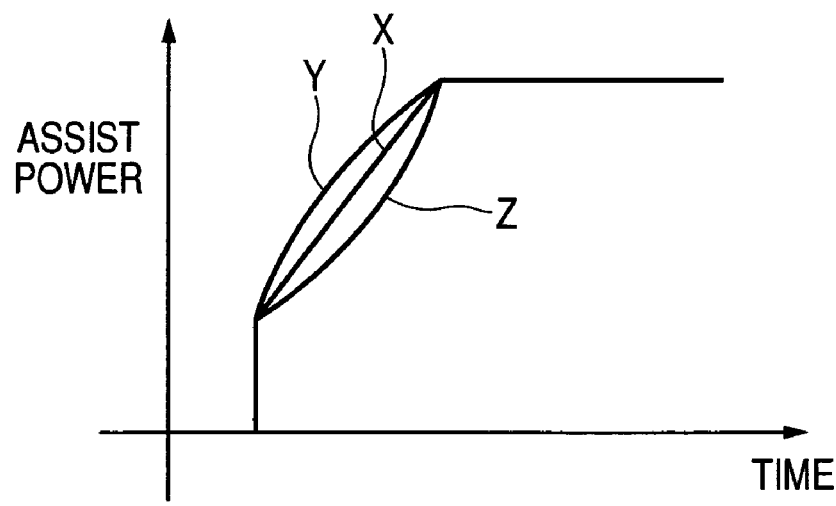
FIG. 8 is a time chart schematically illustrating the waveforms of pieces of assist power according to the second embodiment.

Note that the waveform of the increasing rate of the assist power Pa during the assist steep-increasing period can be set to a liner slope X shown in FIG. 8, or to one of convex and concave slopes Y and Z shown in FIG. 8 based on the efficiency of the motor 303 and/or the number of revolutions thereof.

As described above, in the first embodiment, the increase (increasing rate) of the assist power Pa during the assist steep-increasing period is set to be substantially equal to the maximum increase (maximum increasing rate) of the alternator output during the assist steep-increasing period. This makes it possible to improve the acceleration response to the assist requirement while preventing discharge of the battery 305 and decrease of the power supply voltage.

Specifically, even if the increase (increasing rate) of the assist power Pa during the assist steep-increasing period is 130 percent of the maximum increase (maximum increasing rate) of the alternator output during the assist steep-increasing period, power exceeding 100 percent of the maximum increase of the alternator output during the assist steep-increasing period is covered by the discharge of the battery. Discharge of 30 percent of the maximum increase of the alternator output from the battery during the assist steep-increasing period can prevent the power supply voltage for the electrical loads from decreasing. That is, in the second embodiment, it is possible to feed the highest possible assist power Pa to the turbocharger 301, preventing the vehicle acceleration feeling from deteriorating.

As described above, the battery 305 discharges part of the assist power Pa at the early stages of the assist steep-increasing period, which corresponds to 30 percent of the maximum increase of the alternator, to feed it to the turbocharger 301 within a permissible power supply voltage drop rate. Increase of the assist power Pa at the early stages of the assist steep-increasing period can be effective to smoothly provide increase in the engine torque and increase in the alternator output.

The permissible power supply voltage drop rate can be set to, for example, a drop rate within 5 percent of the battery voltage (power supply voltage). This allows part of the assist power Pa to be supplied from the battery 305 while tolerating adverse affect to the electrical loads. In addition, it is possible to charge the battery 305 within a permissible power supply voltage rising rate from the alternator 304 at late stages of the assist steep-increasing period or just after the assist steep-increasing period.

In the second embodiment, if the assist steep-increasing period is considerably shorter than the delay time constant (the assist steep-increasing period is shorter than 70 percent of the delay time constant for example), the assist steep-increasing period may be terminated without waiting sufficient increase in the alternate output, resulting that much of the assist power fed to the turbocharger 301 may be supplied from the battery 305. This may cause the power supply voltage to drop to an unacceptable level. Otherwise, only a little assist power may be fed from the battery to the turbocharger in order to prevent the power supply voltage from dropping to the unacceptable level.

However, in the second embodiment, the assist steep-increasing period is set to be substantially equal to the delay time constant required to execute the alternator output control (feedback control). Specifically, the assist steep-increasing period is set to be 70 to 100 or 100 to 130 percent (70 to 130 percent) of the delay time (delay time constant) of the generator.

This makes it possible to increase the assist power up to the maximum value while preventing discharge of the battery 305 and decrease of the power supply voltage during the assist steep-increasing period.

That is, because the assist steep-increasing period is substantially equal to the delay time constant of the generator, the assist steep-increasing period is terminated after sufficient increase in the alternate output. This permits much of the assist power fed to the turbocharger 301 to be supplied from the alternator 304. This makes it possible to prevent the power supply voltage from dropping to an unacceptable level.

In the fit embodiment, one of the important points of feeding the assist power Pa to the electrically-assisted turbocharger 301 is that the waveform of the assist power Pa that increases at the predetermined increasing rate dPa/dt at the early stages of the power assist (the feeding of the assist power Pa to the turbocharger 301).

Therefore, it is possible to reduce or interrupt the power supply to at least another one of the electrical loads, such as a motor-driven compressor for air-conditioning, during the assist steep-increasing period. This permits an increase in the alternator torque to be suppressed, making it possible to increase the vehicle accelerating torque to increase with high response to the assist request.

Characteristics related to the alternator output depend on a plurality of parameters related to the number of revolutions of the engine corresponding to the number of revolutions of the alternator's rotor and/or the current amount of power supply to the vehicle electrical loads. Therefore, the controller 308 can detect the parameters to set the increasing rate of the assist power Pa and/or the limit power value Path during the assist steep-increasing period based on the detected parameters. This allows the turbocharger 301 to be most efficiently electrically assisted with maintenance of the power supply voltage.

Third Embodiment

A third embodiment of the present invention will be described hereinafter with reference to FIGS. 9 to 11.

A power feeding system according to the third embodiment of the present invention has, for example, the me structure of its electric system as the power feeding system PS2 illustrated in FIG. 4. Note that elements of the power feeding system according to the third embodiment, which are substantially identical to those of the power feeding system PS2 according to the second embodiment shown in FIG. 4, are represented by the same reference characters as in FIG. 4. The descriptions of the elements of the power feeding system according to the third embodiment are therefore omitted or simplified.

In the third embodiment, the controller 308 has a timer for counting time. In addition, the memory of the controller 308 has stored therein an intermediate limit power value Path1, which has been predetermined such that the intermediate limit power value Path1 is not more than the maximum permissible power value at intermediate stages for power assist. Moreover, the memory of the controller 308 has stored therein a final limit power value Path2, which has been predetermined such that the final limit power value Path2 is not more tan the maximum permissible power value at final stages for power assist.

Next, operations of the assist control of the controller 308 according to the third embodiment will be described hereinafter with reference to a time chart illustrated in FIG. 9.

When the assist request signal is input to the controller 308 or is generated by the controller 308 at a time t0, the controller 308 controls the switching elements 306a of the inverter 306 based on duties so as to cause the inverter 306 to feed assist power Pa as assist energy to the motor 303; the assist power Pa increases at a predetermined power increasing rate (dPa1/dt).

The motor 303 receives the assist power Pa and electrically assists the turbocharger 302 by rotating the rotating shaft thereof based on the assist power Pa.

Next, when detecting that the assist power Pa reaches the intermediate limit power value Path1 at a time t1 by referring to the memory, the controller 308 controls the switching elements 306a of the inverter 306 based on duties so as to lock the assist power Pa to the intermediate limit power value Path1. As a result, thereafter, the motor 303 electrically assists the turbocharger 302 by rotating the rotating shaft thereof based on the assist power Path1.

Subsequently, after time has elapsed from the time t1 to a time t2 while the assist power Path1 is fed to the motor 303, the controller 308 controls the switching elements 306a of the inverter 306 based on duties so as to cause the inverter 306 to feed the assist power Pa to the motor 303; the assist power Pa increases at a predetermined power increasing rate (dPa2/dt).

The motor 303 receives the assist power Pa and electrically assists the turbocharger 302 by rotating the rotating shaft thereof based on the assist power Pa.

Next, when detecting that the assist power Pa reaches the final limit power value Path2 at a time t3 by referring to the memory, the controller 308 controls the switching elements 306a of the inverter 306 based on duties so as to lock the assist power Pa to the final limit power value Path2. As a result, thereafter, the motor 303 electrically assists the turbocharger 302 by rotating the rotating shaft thereof based on the assist power Path2.

Next, operations of the assist control of the controller 308 set forth above will be described hereinafter in more detail with reference to a flow chart illustrated in FIG. 10. The routine illustrated in FIG. 10 substantially includes operations of steps Sill to 8118 added to the routine illustrated in FIG. 10.

Figure 10:
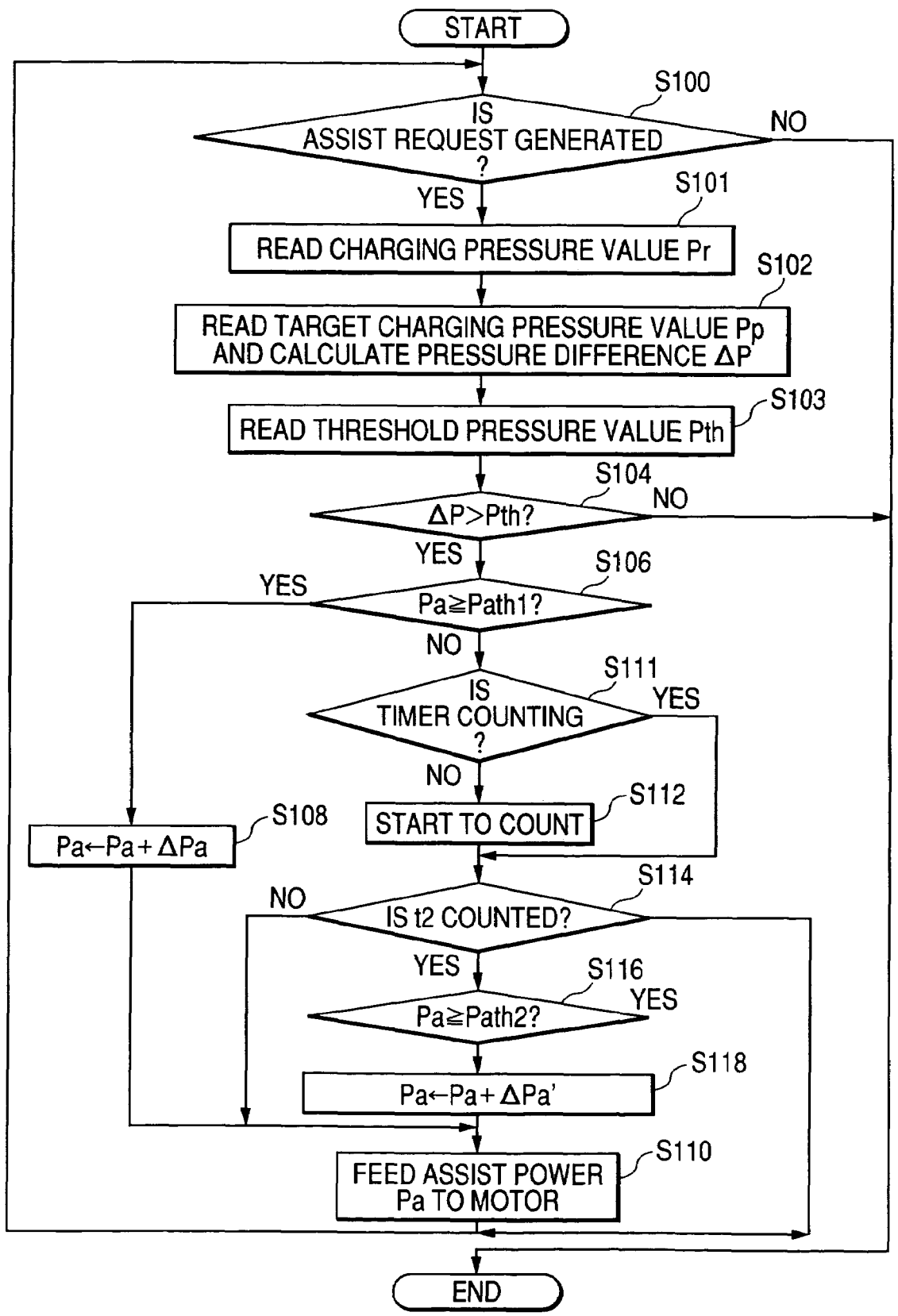
FIG. 10 is a flowchart schematically illustrating operations of a controller according to the third embodiment.

When receiving or generating the assist request (the determination in step S100 is YES in FIG. 10, the controller 308 reads the charging pressure value Pr sensed by the pressure sensor and sent therefrom (step S101). The controller 38 reads out the target charging pressure value Pp from the memory, and calculates a pressure difference $\Delta P$ between the target charging pressure Pp and the charging pressure value Pr in step S102.

Note that, in the third embodiment, the controller 308 reads out the target charging pressure value Pp from the memory, but the present invention is not limited to the structure. Specifically, target charging pressures have been stored in the memory such that they are associated with corresponding degrees of the driver's press of the accelerator and/or corresponding rates of the degrees thereof. The controller 308 can therefore search one of the target charging values corresponding to the magnitude and/or increasing rate of the degree of the driver's press detected by the throttle potentiometer.

In addition, the controller 308 can calculate the target charging pressure based on the engine revolutions and the vehicle speed in addition to the magnitude and/or increasing rate of the degree of the driver's press detected by the throttle potentiometer.

After the step S102, the controller 308 reads out the threshold pressure value Pth from the memory in step S103, and determines whether the pressure difference $\Delta P$ exceeds the threshold pressure value Pth in step S104.

When it is determined that the pressure difference $\Delta P$ is less than the threshold pressure value Pth (the determination in step S104 is NO), the controller 308 terminates the operations.

When it is determined that the pressure difference $\Delta P$ is equal to or more than the threshold pressure value Pth (the determination in step S104 is YES), the controller 308 determines whether the assist power Pa that should be outputted to the inverter 6 reaches the intermediate limit power value Path in step S106.

When it is determined that the assist power Pa does not reach the intermediate limit power value Path1 (the determination in step S106 is NO), the controller 308 controls the switching elements 306a of the inverter 306 based on duties so as to add predetermined power increases $\Delta Pa$ to the assist power Pa, thereby regarding the sum of the assist power Pa and the power increases $\Delta Pa$ to be the assist power Pa in step S108. That is, the controller 308 adjusts the power increases $\Delta Pa$ to control the increasing rate (dpa1/dt) of the assist power Pa in step S108.

Subsequently, the controller 308 controls the switching elements 306a of the inverter 306 based on duties so as to cause the inverter 306 to feed the assist power Pa to the motor 303 in step S110, returning to step S100.

In contrast, when it is determined that the assist power Pa reaches the intermediate limit power value Path (the determination in step S106 is YES), the switching elements 306a of the inverter 306 have been controlled by the controller 308 based on duties so as to feed the assist power Pa that is locked to the intermediate limit power value Path1 to the motor 303. Next, the controller 308 determines whether the timer is counting in step S111.

When it is determined that the timer is counting (the determination in step S111 is YES), the controller 308 jumps to step S114. In contrast, when it is determined that the timer is not counting (the determination in step S111 is NO), the controller 308 controls the timer to start to count time in step S112, shifting to step S114.

In step S114, the controller 308 determines whether the timer counts to the time t2. When it is determined that the timer does not count to the time t2 (the determination in step S114 is NO), the controller 308 shifts to step S110.

In contrast, when it is determined that the timer counts to the time t2 (the determination in step S114 is YES), the controller 308 determines whether the assist power Pa reaches the final limit power value Path2 in step S116.

When it is determined that the assist power Pa does not reach the final limit power value Path2 (the determination in step 3116 is NO), the controller 308 controls the switching elements 306a of the inverter 306 based on duties so as to add predetermined power increases $\Delta Pa'$ to the assist power Pa, thereby regarding the sum of the assist power Pa and the power increases $\Delta Pa'$ to be the assist power Pa in step S118. That is, the controller 308 adjusts the power increases $\Delta Pa'$ to control the increasing rate (dPa2/dt) of the assist power Pa in step S118.

Subsequently, the controller 308 controls the switching elements 306a of the inverter 306 based on duties so as to cause the inverter 306 to feed the assist power Pa to the motor 303 in step S110, returning to step S100.

In contrast, when it is determined that the assist power Pa reaches the final limit power value Path2 (the determination in step S116 is YES), the switching elements 306a of the inverter 306 have been controlled by the controller 308 based on duties so as to feed the assist power Pa that is locked to the final limit power value Path2 to the motor 303. Thus, the controller 308 returns to step S100.

Figure 11:
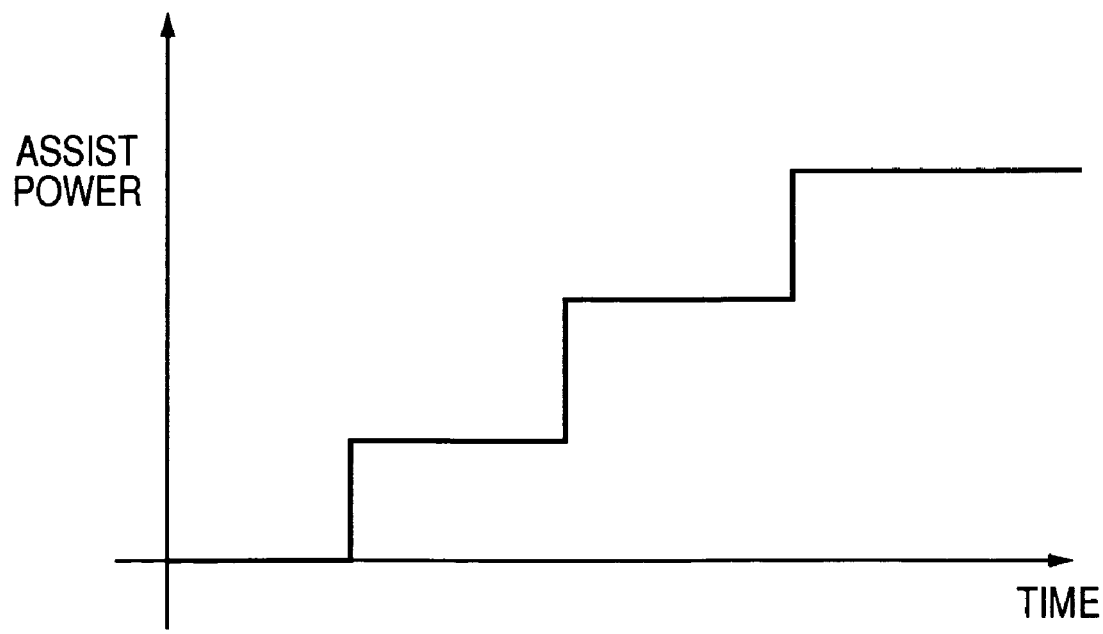
FIG. 11 is a time chart schematically illustrating the waveform of assist power according to the third embodiment of the present invention.

Note that the power increases $\Delta Pa'$ can be set to the same as the power increases $\Delta Pa$ In addition, in the third embodiment, the assist power Pa is discretely increased at two power increasing rates dPa1/dt and dPa2/dt (see FIG. 9), but the assist power Pa can be discretely increased at many power increasing rates (see FIG. 11).

As described above, in the third embodiment of the present invention, when the assist request is generated, the controller 308 causes the inverter to feed the assist power Pa to the motor 303 while increasing it at the predetermined increasing rate (dPa1/dt during a predetermined period of time (t1-t0). After the assist power Pa has reached the intermediate limit power value Path1, the controller 308 causes the inverter 306 to constantly feed the limit power value Path1 to the motor 303 during a predetermined period of time (t2-t1).

Thereafter, the controller 308 causes the inverter to feed the assist power Pa to the motor 303 while increasing it at the predetermined increasing rate (dPa2/dt) during a predetermined period of time (t3-t2). After the assist power Pa has reached the final limit power value Path2, the controller 308 causes the inverter 306 to constantly feed the limit power value Patb2 to the motor 303 after the time tS.

This allows, because the number of revolutions of the turbocharger is small at the early stages of the power assist, even if the assist power Pa is small, the assist power Pa to assist the rotation of the turbocharger. This can obtain the boost effect to the charge air. After the early stages, when the number of revolutions of the turbocharger is increased, it is possible to obtain the boost effect to the charge air based on the assist power Pa.

In addition, in the third embodiment, because increase of the assist power Pa is interrupted when the assist power Pa reaches the intermediate limit power value Path1, it is possible to improve the increasing rate of the assist power Pa from the time to t0 the time t1 while preventing discharging of the battery and decreasing of the power supply voltage of the power supply system.

An object of a first modification of the third embodiment is to set the increasing rate of the assist power Pa during the assist steep-increasing period to be substantially equal to the maximum alternator-output increasing rate that is settable during the assist steep-increasing period.

Specify, in the first modification of the third embodiment, the controller 308 can determine the increasing rate of the power assist during the assist steep-increasing period by dividing the increase of the assist power Pa during the assist steep-increasing period by the length of the assist steep-increasing period. Similarly, the controller 308 can determine the alternator-output increasing rate by dividing the increase of the alternator output during the assist steep-increasing period by the length of the assist steep-increasing period.

When the controller 308 controls the alternator 304 to operate it based on the determined maximum alternator-output increasing rate, a possible assist steep-increasing period corresponding to the maximum alternator-output increasing rate can be expected. In addition, the controller 308 sets the increasing rate of the assist power Pa to 70 to 130 percent of the possible assist-increasing period. The first modification also can obtain the same effects as the second embodiment. Note that the length of the possible assist-increasing period can be expected based on the current operating state of the vehicle and map data including lengths of possible assist-increasing periods associated with parameters representing the operating state of the vehicle. The map data has been stored in the controller 308.

As a second modification of the second embodiment, the controller 308 can control the assist power Pa such that the integration value of the assist power Pa during the assist steep-increasing period is substantially equal to 70 to 130 percent of the integration value of the alternator output during the assist steep-increasing period. The second modification harder can obtain the same effects as the second embodiment Note that the integration value of the alternator output can be expected based on the operating state of the vehicle and map data including integration values of the alternator output associated with parameters representing the operating state of the vehicle. The map data has been stored in the controller 308.

While there has been described what is at present considered to be the embodiments and modifications of the present invention, it will be understood that various modifications which are not described yet may be made therein, and it is intended to cover in the appended claims all such modifications as fall within the true spirit and scope of the invention.

What is claimed is:

1. A control system for controlling a power supply voltage to be fed to a plurality of electrical loads from a power supply system having an engine-driven generator and a battery chargeable by an output of the generator, the power supply voltage depending on the output of the generator, the control system comprising:
    a control unit connected to the generator and configured to:
        converge the power supply voltage to a predetermined target voltage; and
        when a steep change in a load current flowing through at least one specific electrical load in the electrical loads is sensed, control the output of the generator based on the sensed steep change in the load current so as to reduce variations in the power supply voltage under converging of the power supply voltage to the predetermined target voltage.

2. A control system according to claim 1, wherein, when the steep change in the load current flowing through at least one specific electrical load in the electrical loads is sensed, the control unit is configured to change the output of the generator, an amount of the output change of the generator being substantially equivalent to that of the steep change in the load current.

3. A control system according to claim 1, wherein the control unit has stored an amount of the steep change in the load current, and, when the steep change in the load current flowing through at least one specific electrical load in the electrical loads is sensed, the control unit is configured to change the output of the generator, an amount of the output change of the generator being substantially equivalent to the stored amount of the steep change in the load current.

4. A control system according to claim 1, wherein the generator has a field winding configured to generate an alternating current voltage based on a field current flowing therethrough, and a switching element switchable on and off and connected to the field winding and the control unit, and when the steep change in the load current flowing through at least one specific electrical load in the electrical loads is sensed, the control unit is configured to cause the switching element to be switched on and off, thereby changing the amount of the field current flowing through the field winding.

5. A control system according to claim 1, wherein the control unit is connected to an engine control unit, and is configured to send, to the engine control unit, a command that allows the engine control unit to control an engine, thereby generating torque equivalent to the output of the generator corresponding to the sensed steep change in the load current.

6. A control system according to claim 1, wherein the control unit is configured to:
    calculate a difference between the voltage of the power supply system and the predetermined target voltage in response to the sense of the steep change in the load current;
    calculate a first controlled variable related to the output of the generator based on the calculated difference;

calculate a second controlled variable related to the output of the generator based on the sensed steep change in the load current;

calculate the sum of the first controlled variable and the second controlled variable to generate a total controlled variable; and control the output of the generator based on the total controlled variable.

7. A method of controlling a power supply voltage to be fed to a plurality of electrical loads from a power supply system having an engine-driven generator and a battery chargeable by an output of the generator, the power supply voltage depending on the output of the generator, the method comprising:

converging the power supply voltage to a predetermined target voltage;

sensing a steep change in a load current flowing through at least one specific electrical load in the electrical loads; and controlling the output of the generator based on the sensed steep change in the load current so as to reduce variations in the power supply voltage under converging of the power supply voltage to the predetermined target voltage.

* * * * *